US008349928B2

(12) United States Patent
Harimoto

(10) Patent No.: US 8,349,928 B2
(45) Date of Patent: Jan. 8, 2013

(54) METAL PARTICLE DISPERSION STRUCTURE, MICROPARTICLES COMPRISING THIS STRUCTURE, ARTICLES COATED WITH THIS STRUCTURE, AND METHODS OF PRODUCING THE PRECEDING

(75) Inventor: Yukinari Harimoto, Hadano (JP)

(73) Assignee: Dow Corning Toray Co., Ltd., Tokyo (JP)

( * ) Notice: Subject to any disclaimer, the term of this patent is extended or adjusted under 35 U.S.C. 154(b) by 279 days.

(21) Appl. No.: 12/682,292

(22) PCT Filed: Oct. 9, 2008

(86) PCT No.: PCT/JP2008/068815
§ 371 (c)(1),
(2), (4) Date: Jun. 16, 2010

(87) PCT Pub. No.: WO2009/048169
PCT Pub. Date: Apr. 16, 2009

(65) Prior Publication Data
US 2010/0267885 A1 Oct. 21, 2010

(30) Foreign Application Priority Data
Oct. 11, 2007 (JP) .................................. 2007-265528

(51) Int. Cl.
*C08G 77/50* (2006.01)
(52) U.S. Cl. ........ 524/176; 524/785; 524/781; 524/731; 524/780; 524/268; 524/862; 524/440
(58) Field of Classification Search .................. 524/176, 524/440, 862, 780, 731, 781, 785
See application file for complete search history.

(56) References Cited

U.S. PATENT DOCUMENTS

| 5,047,380 A | | 9/1991 | Tour et al. | |
|---|---|---|---|---|
| 5,258,435 A | * | 11/1993 | Huggins et al. | ................ 524/357 |
| 6,099,964 A | | 8/2000 | Baumann et al. | |
| 6,294,635 B1 | * | 9/2001 | Achenbach et al. | ............ 528/15 |

FOREIGN PATENT DOCUMENTS

| EP | 0647682 A1 | 4/1995 |
|---|---|---|
| JP | 64-062475 A | 3/1989 |
| JP | 01-115957 A | 5/1989 |
| JP | 02-051535 A | 2/1990 |
| JP | 10-219112 A | 8/1998 |
| JP | 11-271981 A | 10/1999 |
| JP | 2000-073176 A | 3/2000 |
| JP | 2001-152045 A | 6/2001 |
| JP | 2001-316501 A | 11/2001 |
| JP | 2001-527108 A | 12/2001 |
| JP | 2002-004057 A | 1/2002 |

OTHER PUBLICATIONS

English language abstract for JP 64-062475 extracted from PAJ database, dated Jun. 25, 2010, 14 pages.
English language abstract for JP 01-115957 extracted from espacenet.com database, dated Jun. 25, 2010, 5 pages.
English language abstract for JP 02-051535 extracted from espacenet.com database, dated Jun. 25, 2010, 6 pages.
English language translation and abstract for JP 10-219112 extracted from PAJ database, dated Jun. 25, 2010, 74 pages.
English language translation and abstract for JP 11-271981 extracted from PAJ database, dated Jun. 25, 2010, 35 pages.
English language translation and abstract for JP 2000-073176 extracted from PAJ database, dated Jun. 25, 2010, 40 pages.
English language translation and abstract for JP 2001-152045 extracted from PAJ database, dated Jun. 25, 2010, 59 pages.
English language translation and abstract for JP 2001-316501 extracted from PAJ database, dated Jun. 25, 2010, 36 pages.
English language translation and abstract for JP 2001-527108 extracted from espacenet.com / PAJ databases, dated Jun. 25, 2010, 39 pages.
English language translation and abstract for JP 2002-004057 extracted from PAJ database, dated Jun. 25, 2010, 66 pages.
PCT International Search Report for Application No. PCT/JP2008/068815, dated Jan. 26, 2009, 4 pages.

* cited by examiner

*Primary Examiner* — Margaret Moore
(74) *Attorney, Agent, or Firm* — Howard & Howard Attorneys PLLC

(57) ABSTRACT

A metal particle dispersion structure characteristically comprising (B) 0.005 to 100 weight parts of metal nanoparticles dispersed in (A) 100 weight parts of polymerized polymer, wherein the metal nanoparticles are metal particles obtained by mixing (b1) organohydrogenpolysiloxane and (b2) at least one metal compound which is soluble in component (b3) to uniformity in (b3) cyclic or chain dimethylpolysiloxane or at least one organic solvent.

13 Claims, 1 Drawing Sheet

METAL PARTICLE DISPERSION STRUCTURE, MICROPARTICLES COMPRISING THIS STRUCTURE, ARTICLES COATED WITH THIS STRUCTURE, AND METHODS OF PRODUCING THE PRECEDING

RELATED APPLICATIONS

This application claims priority to and all the advantages of International Patent Application No. PCT/JP2008/068815, filed on Oct. 9, 2008, which claims priority to Japanese Patent Application No. JP2007-265528, filed on Oct. 11, 2007.

TECHNICAL FIELD

The present invention relates to a metal particle dispersion structure that has a structure in which metal nanoparticles having an average primary particle size as yielded by electron microscopic observation of 3 to 1,000 nm are dispersed in a polymer. The present invention relates in particular to a silicone materials containing dispersed metal nanoparticle in the structure (silicone-type metal particle dispersion structure). The present invention additionally relates to microparticle comprising this metal particle dispersion structure and to articles coated with this metal particle dispersion structure and to production methods that enable the subject metal particle dispersion structure to be obtained very easily.

BACKGROUND ART

Particle size effects, such as optical functions, surface-modification functions, thermal properties, and so forth, appear when a metal is microfine-sized to the nanosize level, and it is therefore expected that polymer composites that incorporate such metal particles will behave as functional materials. Structures comprising metal microparticles dispersed in a polymer matrix are in fact known, and the dispersion of metal nanoparticles in a crosslinked polymer and particularly a silicone-type polymer is known for the purpose of obtaining a photofunctional material or imparting electroconductivity (for example, Patent References 1 to 3). However, achieving a uniform dispersion of the metal nanoparticles in the polymer matrix is problematic in the cited methods, and the polymer functionality anticipated for metal nanoparticle incorporation has yet to be satisfactorily achieved. In addition, uniform metal nanoparticles are very unstable during handling because they readily aggregate during handling with a distinct tendency to form large particles. Due to a high reactivity, they are also prone to problems such as outscattering and oxidation when simply handled in air. This has made it difficult to produce uniform metal nanoparticles on an industrial basis, and the facile mass production of structures comprising metal microparticles dispersed in a polymer matrix without the use of special production facilities has been quite problematic, particularly with regard to industrial manufacturing processes.

Surface treatment and electroless plating methods are also known in which an article or particulate having SiH-functional polysiloxane at the surface is treated with, for example, an aqueous solution containing a metal cation, thereby reducing the metal cation at the surface of the particulate or article and coating the particulate or article with a surface metal film (for example, Patent References 4 to 9). However, in these surface-treatment technologies, the post-reduction metal forms a coating layer in which the metal atoms are disposed in the form of a layer over the treated surface as a whole, and as a consequence the particle effects expected for metal nanoparticles, i.e., various functions such as optical functions, surface-modification functions, thermal properties, and so forth, are lost.

Patent Reference 10, on the other hand, describes the precipitation and separation of metal by the reduction of a metal compound in organic solvent or aqueous solution using a reducing agent. Organic solvent-soluble crosslinked polysiloxane particles that include this metal are also described. It is also taught that the metal compound can be reduced by the silicon hydride bond. However, this Patent Reference 10 teaches the formation of metal nanoparticles on the surface of the crosslinked polysiloxane after its production and describes neither a structure in which stable metal nanoparticles are dispersed in a crosslinked polymer matrix nor the formation of a structure in which metal nanoparticles are stably incorporated in a polymer matrix.

Patent References:
[Patent Reference 1] JP 2001-316501 A (JP 3,517,698 B)
[Patent Reference 2] JP (PCT) 2001-527108 A
[Patent Reference 3] JP 02-051535 A (JP 04-077401 B)
[Patent Reference 4] JP 01-115957 A (JP 2,686,750 B)
[Patent Reference 5] JP 2000-073176 A
[Patent Reference 6] JP 64-062475 A
[Patent Reference 7] JP 2002-004057 A (JP 3,536,788 B)
[Patent Reference 8] JP 2001-152045 A (JP 3,716,903 B)
[Patent Reference 9] JP 11-271981 A (JP 3,440,815 B)
[Patent Reference 10] JP 10-219112 A (JP 2,956,030 B)

DISCLOSURE OF INVENTION

Problems to be Solved by the Invention

The present invention was pursued in order to solve the problems cited above. An object of the present invention is to provide a metal particle dispersion structure in which metal nanoparticles having an average particle size of 3 to 1,000 nm are uniformly dispersed in a structure (the polymer matrix) comprising a polymer. An additional object of the present invention is to provide a method of producing this metal particle dispersion structure that enables the facile mass production of this metal particle dispersion structure in an industrial manufacturing process. Further objects of the present invention are to provide a film-shaped structure comprising the metal particle dispersion structure and to provide a microparticulate structure comprising the metal particle dispersion structure. Yet another object of the present invention is to provide an article whose surface is coated with the metal particle dispersion structure under consideration.

Means Solving the Problems

The objects cited above are achieved by
"[1] A metal particle dispersion structure characteristically comprising
 (B) 0.005 to 100 weight parts of metal particles having an average primary particle size, as determined by electron microscopic observation, in the range of 3 to 1,000 nm dispersed in
 (A) 100 weight parts of polymer yielded by the polymerization of
  (a) reactive functional group-containing polymer precursor,
 wherein the metal particles are metal particles obtained by mixing
  (b1) at least one organosilicon compound that has at least one silicon-bonded hydrogen atom per molecule and (b2) at least one metal compound having the compositional formula (1) shown below

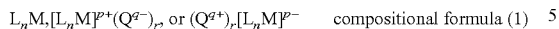 compositional formula (1)

(wherein M is the cation of a metal that has a standard oxidation-reduction potential greater than 0.00 V,
L is an organic ligand,
Q is a counterion,
n is the number of organic ligands L coordinated per metal atom, and
p, q, and r are numbers that satisfy the relationship $p=q \times r$.)
to uniformity in
(b3) cyclic or chain dimethylpolysiloxane that has a viscosity at 25° C. no greater than 1000 mPa·s or at least one organic solvent

[2] The metal particle dispersion structure according to [1], wherein component (a) is at least one organosilicon compound selected from crosslinkable organosilanes and/or organosiloxanes and component (A) is an organosilicon-type polymer yielded by the crosslinking of said organosilicon compound or compounds.

[3] The metal particle dispersion structure according to [1], characterized in that M in the compositional formula (1) for component (b2) is the cation of at least one metal selected from the group consisting of copper (Cu), silver (Ag), gold (Au), palladium (Pd), and platinum (Pt) and in that L in the compositional formula (1) for component (b2) is at least one organic ligand selected from the group consisting of $C_{2-20}$ alcohols, thiols, aliphatic chain amines, aliphatic cyclic amines, aromatic amines, pyridine derivatives, diketones, ketoesters, hydroxyketones, and carboxylate anions.

[4] A method of producing the metal particle dispersion structure of [1], characteristically comprising:
mixing the (a) reactive functional group-containing polymer precursor, the (b1) at least one organosilicon compound that has at least one silicon-bonded hydrogen per molecule, and the (b2) at least one metal compound having the compositional formula (1) shown below, to uniformity in the (b3) cyclic or chain dimethylpolysiloxane that has a viscosity at 25° C. no greater than 1000 mPa·s or at least one organic solvent; and
causing component (a) to undergo a crosslinking reaction,

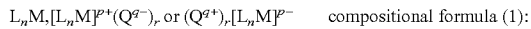 compositional formula (1):

wherein
M is the cation of a metal that has a standard oxidation-reduction potential greater than 0.00 V,
L is an organic ligand,
Q is a counter ion,
n is the number of organic ligands L coordinated per metal atom, and
p, q, and r are numbers that satisfy the relationship $p=q \times r$.

[5] The metal particle dispersion structure according to [1] or [2], wherein component (A) is organopolysiloxane obtained by crosslinking between
(a1) organosilane that has at least two alkenyl groups per molecule and/or organosiloxane that has at least two alkenyl groups per molecule
and
(a2) organohydrogenpolysiloxane that has at least two silicon-bonded hydrogen atoms per molecule in the presence of
(a3) a hydrosilylation reaction catalyst.

[6] A method of producing the metal particle dispersion structure of [1], comprising:
uniformly mixing the (a1) organosilane that has at least two alkenyl groups per molecule and/or organosiloxane that has at least two alkenyl groups per molecule, the (a2) organohydrogenpolysiloxane that has at least two silicon-bonded hydrogen atoms per molecule, the (b2) at least one metal compound having the compositional formula (1) shown above, and the (b3) cyclic or chain dimethylpolysiloxane that has a viscosity at 25° C. no greater than 1000 mPa·s and/or at least one organic solvent; and
causing a crosslinking reaction in the presence of the (a3) hydrosilylation reaction catalyst.

[7] The metal particle dispersion structure of [1], wherein component (b2) is a metal compound characterized in that M in the aforementioned compositional formula is the cation of at least one metal selected from the group consisting of platinum (Pt), gold (Au), silver (Ag), and copper (Cu); L in the aforementioned compositional formula is a monovalent carboxylate anion represented by $R^1$—COO—($R^1$ in the formula is substituted or unsubstituted $C_{1-20}$ alkyl), an amine represented by $R^2$—$NH_2$ ($R^2$ in the formula is substituted or unsubstituted $C_{4-20}$ alkyl), or an alkylenediamine with the formula $H_2N$—$R^3$—$NH_2$ ($R^3$ in the formula is substituted or unsubstituted $C_{4-20}$ alkylene); Q in its occurrence as a positively charged counterion in the aforementioned compositional formula is a cation selected from the group consisting of the proton ($H^+$), ammonium ion ($NH_4^+$), sodium ion ($Na^+$), and potassium ion ($K^+$); and Q in its occurrence as a negatively charged counter-ion in the aforementioned compositional formula is an anion selected from the group consisting of the nitrate ion ($NO_3^-$), chloride ion ($Cl^-$), sulfate ion ($SO_4^{2-}$), and perchlorate ion ($ClO_4^-$).

[8] The metal particle dispersion structure according to any of [1] to [7], that characteristically is a film or a thin-film coating that has a thickness of 0.1 μm to 10,000 μm.

[9] The metal particle dispersion structure according to any of [1] to [7], that characteristically is a particulate metal particle dispersion structure that has an average particle size, as yielded by stereoscopic microscopic observation or dynamic light-scattering particle size distribution measurements, in the range of 0.01 to 1000 μm.

[10] A method of producing the particulate metal particle dispersion structure of [9], comprising:
emulsifying the (a1) organosiloxane that has at least two alkenyl groups per molecule, the (a2) organohydrogenpolysiloxane that has at least two silicon-bonded hydrogen atoms per molecule, the (b2) at least one metal compound having the compositional formula (1) shown below, the (b3) cyclic or chain dimethylpolysiloxane that has a viscosity at 25° C. no greater than 1000 mPa·s, and the (a3) hydrosilylation reaction catalyst, in water in the presence of (C) an emulsifying agent; and
causing a crosslinking reaction in the water,

 compositional formula (1)

wherein
M is the cation of a metal that has a standard oxidation-reduction potential greater than 0.00 V,
L is an organic ligand,
Q is a counter ion,
n is the number of organic ligands (L) coordinated per metal atom, and
p, q, and r are numbers that satisfy the relationship $p=q \times r$.

[11] An article coated with a metal particle dispersion structure according to any of claims 1 to 7."

Effects of the Invention

The present invention can provide a metal particle dispersion structure in which metal nanoparticles having an average particle size of 3 to 1,000 nm are uniformly dispersed in a structure (the polymer matrix) comprising a polymer. The present invention can also provide a film material comprising this metal nanoparticle-containing metal particle dispersion structure and a microparticulate material comprising this metal nanoparticle-containing metal particle dispersion structure, and can additionally provide an article whose surface is coated by the metal particle dispersion structure. Unlike the surface coatings yielded by metal precipitation, these metal particle dispersion structures have the advantage of not losing the functionalities that originate in the particle effects of the metal nanoparticles, e.g., optical functions (e.g., color generation), surface-modification functions, thermal characteristics, and so forth. The inventive methods of producing the subject metal particle dispersion structure have the advantage of enabling the facile mass production of this metal particle dispersion structure in an industrial manufacturing process and are very useful for their ability to stabilize the product and provide the marketplace with a stabilized product.

BEST MODE FOR CARRYING OUT THE INVENTION

The metal particle dispersion structure of the present invention will be described in detail first while providing optimal embodiments thereof.

The metal particle dispersion structure of the present invention characteristically comprises a metal particle dispersion structure characterized in that (B) 0.005 to 100 weight parts of metal particles having an average primary particle size, as determined by electron microscopic observation, in the range of 3 to 1,000 nm is dispersed in (A) 100 weight parts polymer yielded by the crosslinking of
  (a) a crosslinkable structure-containing polymer precursor, wherein the metal particles are metal particles obtained by mixing (b1) at least one organosilicon compound that has at least one silicon-bonded hydrogen atom per molecule
and
(b2) at least one metal compound having the following compositional formula

  compositional formula (wherein M is the cation of a metal that has a standard oxidation-reduction potential greater than 0.00 V, L is an organic ligand, Q is a counter ion, n is the number of organic ligands L coordinated per metal atom, and p, q, and r are numbers that satisfy the relationship p=q×r)
to uniformity in
(b3) cyclic or chain dimethylpolysiloxane that has a viscosity at 25° C. no greater than 1000 mPa·s or at least one organic solvent.

Component (A) is a polymer yielded by the polymerization of the (a) reactive functional group-containing polymer precursor and forms, in the metal particle dispersion structure of the present as described herebelow, a polymeric structure (the polymer matrix) that carries and supports, on its surface and in its interior, the (B) metal particles that have an average primary particle size, as determined by electron microscopic observation, in the range of 3 to 1,000 nm.

Component (A) is a polymer as yielded by the polymerization of one or more monomers, infra, but is not otherwise limited with regard to type, degree of polymerization, or molecular weight. There is also no limitation on the polymerization reaction that operates during polymer formation from the (a) reactive functional group-containing polymer precursor, and this polymerization may be, for example, any of the following: an addition polymerization reaction, e.g., by the hydrosilylation reaction; a polycondensation reaction accompanied by the elimination of water or alcohol; a ring-opening polymerization reaction, for example, of the epoxy ring; or a radical polymerization reaction.

Component (A) can be exemplified by polyorganosiloxanes; polyamides; polyurethanes; acrylic resins such as polyacrylic acids, polyacrylate esters, polymethacrylate esters, and so forth; polyesters such as polyalkylene terephthalate, polyalkylene naphthalate, and so forth; polycarbonates; polyolefins; polyimides; polystyrenes; styrene-butadiene rubbers; and epoxy resins. Component (A) may also be a polymer alloy derived from these polymers or a modified polymer as yielded by the modification of a portion of the terminal or side-chain positions of the preceding by known functional groups. Polyorganosiloxanes are particularly preferred for component (A) in the present invention.

Component (a) is a reactive functional group-containing polymer precursor for obtaining component (A) and is considered in detail in the following along with each component (A). However, in the present invention component (A) can to some degree contain known co-polymerizable monomer within a range in which the polymerization reaction mechanism for obtaining the particular component (A) is not disrupted, and component (a) can also include such co-polymerizable monomer.

The aforementioned polyamide is specifically exemplified by polycaproamide (nylon 6), polyhexamethylene adipamide (nylon 66), polytetramethylene adipamide (nylon 46), polyhexamethylene sebacamide (nylon 610), polyhexamethylene dodecamide (nylon 612), polyundecamide (nylon 11), and polydodecamide (nylon 12). This polyamide can be obtained by the polycondensation of an amino acid (=component (a)) or by the copolymerization by a known method of dicarboxylic acid and diamine or lactam (=component (a)).

The reactive functional group-containing polymer precursor (component (a)) for obtaining the polyamide can be exemplified by amino acids such as 6-aminocaproic acid, 11-aminoundecanoic acid, 12-aminododecanoic acid, para-aminomethylbenzoic acid, and so forth; lactams such as ε-caprolactam, ω-laurolactam, and so forth; diamines such as tetramethylenediamine, hexamethylenediamine, 2-methylpentamethyldiamine, nonamethylenediamine, undecamethylenediamine, dodecamethylenediamine, trimethylhexamethylenediamine, 5-methylnonamethylenediamine, meta-xylylenediamine, para-xylylenediamine, 1,3-bis (aminomethyl)cyclohexane, and so forth; and dicarboxylic acids such as adipic acid, suberic acid, azelaic acid, sebacic acid, dodecanedioic acid, terephthalic acid, isophthalic acid, 2-chloroterephthalic acid, 2-methylterephthalic acid, 5-methylisophthalic acid, sodium 5-sulfoisophthalate, 2,6-naphthalenedicarboxylic acid, hexahydroterephthalic acid, hexahydroisophthalic acid, and so forth.

The aforementioned polyurethane can be obtained by reacting, by a known method, a polyhydroxy compound (polyol) and a diisocyanate compound and optionally a short-chain glycol (=component (a)). This component (a) can be exemplified by polyols such as polyester polyol, polyether polyol, polycarbonate diol, and so forth; diisocyanate compounds such as aromatic diisocyanates (e.g., 2,4-tolylene diisocyanate, 2,6-tolylene diisocyanate, diphenylmethane diisocyanate, naphthylene diisocyanate, phenylene diisocyanate, xylylene diisocyanate, tetramethylxylylene diisocyanate, and so forth), aliphatic diisocyanates (e.g., tetramethylene diisocyanate, hexamethylene diisocyanate, 2-methyl-1,5-pentane diisocyanate, 3-methyl-1,5-pentane diisocyanate, lysine diisocyanate, and so forth), and alicyclic diisocyanates (e.g., cyclohexyl diisocyanate and so forth); and glycols such as ethylene glycol, propylene glycol, 1,3-propanediol, 1,4-butanediol, and so forth.

The aforementioned acrylic resin can be specifically exemplified by polyacrylate esters and polymethacrylate esters. These acrylic resins can be obtained by the radical polymerization by a known method of an acrylate ester or methacrylate ester (=component (a)). This component (a) can be exemplified by acrylate esters such as methyl acrylate, ethyl acrylate, n-propyl acrylate, n-butyl acrylate, 2-ethylhexyl acrylate, decyl acrylate, octadecyl acrylate, and so forth, and by methacrylate esters such as methyl methacrylate, ethyl methacrylate, n-propyl methacrylate, n-butyl methacrylate, 2-ethylhexyl methacrylate, decyl methacrylate, octadecyl methacrylate, and so forth.

The aforementioned polyester can be obtained by the polycondensation of polyvalent carboxylic acid (preferably a dicarboxylic acid compound) and polyalcohol (diol) (=component (a)); the polymerization reaction can also be carried out with the optional addition of another copolymerizable monomer. This component (a) can be exemplified by dicarboxylic acid compounds such as isophthalic acid, naphthalenedicarboxylic acid, diphenyldicarboxylic acid, anthracenedicarboxylic acid, phenanthrenedicarboxylic acid, diphenyl ether dicarboxylic acid, diphenoxyethanedicarboxylic acid, diphenylethanedicarboxylic acid, adipic acid, 1,4-cyclohexanedicarboxylic acid, and so forth, and by diols such as ethylene glycol, butylene glycol, pentanediol, hexanediol, 1,4-cyclohexanedimethanol, naphthalenediol, anthracenediol, phenanthrenediol, bisphenol S, and so forth.

The aforementioned polycarbonate can be obtained by the phosgene method, in which a dihydroxydiaryl compound (=component (a)) and phosgene are reacted, or by the ester exchange method, in which the dihydroxydiaryl compound is reacted with a carbonate ester, such as diphenyl carbonate. This component (a) can be exemplified by dihydroxydiaryl compounds, for example, bis(hydroxyaryl)alkanes such as 2,2-bis(4-hydroxyphenyl)propane (common name: bisphenol A), bis(4-hydroxyphenyl)methane, 1,1-bis(4-hydroxyphenyl)ethane, 2,2-bis(4-hydroxyphenyl)butane, and so forth; bis(hydroxyaryl)cycloalkanes such as 1,1-bis(4-hydroxyphenyl)cyclopentane, 1,1-bis(4-hydroxyphenyl)cyclohexane, and so forth; dihydroxydiaryl ethers such as 4,4'-dihydroxydiphenyl ether, 4,4'-dihydroxy-3,3'-dimethyldiphenyl ether, and so forth; dihydroxydiaryl sulfoxides; and dihydroxydiarylsulfones.

The aforementioned polyolefin can be specifically exemplified by polyethylene, polypropylene, ethylene-butene copolymers, ethylene-octene copolymers, ethylene-propylene copolymers, ethylene-propylene-diene copolymers, and polychloroisoprene. This polyolefin can be obtained by the polymerization of olefin (=component (a)) in the presence of a known metal catalyst. This component (a) can be exemplified by ethylene, propylene, butadiene, isoprene, chloroisoprene, propylene, 1-butene, 1-hexene, dicyclopentadiene, 1,4-hexadiene, and ethylene-α-olefin copolymers.

The aforementioned polyimide can be obtained by the imidation reaction, using a procedure such as heating, of the polyamic acid obtained by the polymerization by a known method of a diamine compound and a tetracarboxylic dianhydride (=component (a)). The polyimide can be similarly obtained by the reaction of a diisocyanate compound with a tetracarboxylic dianhydride (=component (a)). The tetracarboxylic dianhydride comprising component (a) can be exemplified by diphenyltetracarboxylic dianhydride, pyromellitic dianhydride, benzophenonetetracarboxylic dianhydride, 3,3',4,4'-diphenylsulfonetetracarboxylic dianhydride, naphthalene-2,3,6,7-tetracarboxylic dianhydride, naphthalene-1,4,5,8-tetracarboxylic dianhydride, 3,3'',4,4''-p-terphenyltetracarboxylic dianhydride, 4,4'-oxydiphthalic dianhydride, 3,3',4,4'-benzophenonetetracarboxylic dianhydride, and bis(2,3-dicarboxyphenyl)sulfone dianhydride. The diamine compound is preferably an aromatic diamine and can be exemplified by 4,4'-diaminodiphenyl ether, p-phenylenediamine, 4,6-dimethyl-m-phenylenediamine, 2,5-dimethyl-p-phenylenediamine, 2,4-diaminomesitylene, 4,4'-methylenedi-o-toluidine, 4,4'-methylenedi-2,6-xylidine, 4,4'-methylene-2,6-diethylaniline, 2,4-toluenediamine, m-phenylenediamine, 4,4'-diaminodiphenylpropane, 2,4-diaminotoluene, m-xylene-2,5-diamine, p-xylene-2,5-diamine, m-xylylenediamine, p-xylylenediamine, 2,6-diaminopyridine, 2,5-diaminopyridine, 2,5-diamino-1,3,4-oxadiazole, and piperazine. The diisocyanate compound comprising component (a) is exemplified by the same compounds as already provided above.

The aforementioned polystyrene can be obtained by the radical polymerization by a known method of styrene (=component (a)). The aforementioned styrene-butadiene rubber can be obtained by radical polymerization by a known method of 1,3-butadiene and styrene (=component (a)) and vulcanization as desired.

The aforementioned epoxy resin can be obtained by the ring-opening polymerization (graft polymerization) by a known method of a prepolymer that has itself been obtained by the copolymerization of an epihalohydrin and a phenol (=component (a)). The phenol can be exemplified by dihydric phenols such as hydroquinone, catechol, dinaphthol, and so forth; 2,2-bis(4-hydroxyphenyl)propane (common name: bisphenol A); and novolac resins obtained from formaldehyde and a phenol, e.g., phenol novolac, cresol novolac, bisphenol novolac, and so forth. The epihalohydrin can be exemplified by epichlorohydrin, epibromohydrin, and β-methylepichlorohydrin.

Organopolysiloxanes and siloxane unit-containing crosslinked polymers are preferred for component (A) in the present invention, and component (a) is preferably at least one organopolysiloxane or organosilane that has a crosslinkable reactive functional group in the molecule. The crosslinking reaction mechanism for the organopolysiloxane or organosilane for obtaining said organopolysiloxane may be a known crosslinking reaction mechanism and is not particularly limited; this crosslinking reaction may be any of the following: a peroxide-based crosslinking reaction that uses an organoperoxide (e.g., benzoyl peroxide) as initiator, a condensation-based crosslinking reaction that proceeds in the presence of a polycondensation catalyst such as a tin compound, an addition-type crosslinking reaction in the presence of a hydrosilylation catalyst such as chloroplatinic acid, an ultraviolet-based crosslinking reaction based on exposure to ultraviolet radiation, and a crosslinking reaction that is a combination of the preceding crosslinking reactions.

A preferred component (A) in the present invention is organopolysiloxane obtained by an addition cure-based crosslinking reaction in the presence of a hydrosilylation catalyst. More specifically, component (A) is preferably organopolysiloxane as yielded by a crosslinking reaction between (a1) organopolysiloxane that has at least two alkenyl groups per molecule and (a2) organohydrogenpolysiloxane that has at least two silicon-bonded hydrogen atoms per molecule in the presence of (a3) hydrosilylation reaction catalyst; this organopolysiloxane is described in detail in the following.

Component (a1) is organopolysiloxane that has at least two alkenyl groups per molecule and can be an organopolysiloxane ranging from a liquid drippable at room temperature (25° C.) to a rubbery form that is not flowable under the influence of gravity at room temperature (25° C.). The viscosity of this organopolysiloxane is preferably 1 to 100,000 mPa·s at 25° C., while 400 to 10,000 mPa·s is more preferred from a handling standpoint. However, a solid or gum soluble in solvent (e.g., an alcohol, toluene, xylene, and so forth) can also be used.

There are no limitations on the molecular structure of component (a1), and the molecular structure may be any of the following: straight chain, branched chain (here and below, this includes branched structures that contain at least one T unit ($SiO_{3/2}$) per molecule and branched structures that contain at least one Q unit ($SiO_{4/2}$) per molecule), resin, or cyclic.

More specifically, each molecule of component (a1) contains at least two alkenyl-functional siloxane units selected from M units given by $[R^1(CH_3)_2SiO_{1/2}]$ and D units given by $[R^1(CH_3)SiO_{2/2}]$. $R^1$ in these formulas is an alkenyl group and preferably is $C_{2-20}$ alkenyl and particularly preferably is $C_{2-6}$ alkenyl, for example, vinyl or 5-hexenyl.

In addition, the organopolysiloxane comprising component (a1) can contain the M unit given by $[R_3SiO_{1/2}]$, the D unit given by $[R_2SiO_{2/2}]$, the T unit given by $[RSiO_{3/2}]$, and the Q unit given by $[SiO_{4/2}]$. R in the formulas is a group independently selected from substituted and unsubstituted monovalent hydrocarbyl excluding the alkenyl comprising $R^1$. This monovalent hydrocarbyl is exemplified by $C_{1-8}$ alkyl such as methyl, ethyl, propyl, butyl, and octyl; aryl such as phenyl and tolyl; aralkyl such as benzyl and phenethyl; and haloalkyl such as chloropropyl and trifluoropropyl, wherein at least 50 mole % of the total number of these groups is preferably $C_{1-8}$ alkyl or phenyl.

In even more specific terms, the organopolysiloxane represented by the following average compositional formula can be used for component (a1).

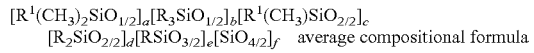

In the formula, a, b, c, d, e, and f in this formula each represent a positive number having a value greater than or equal to 0 and less than 1 and satisfy the relationship a+b+c+d+e+f=1. R and $R^1$ are the same groups as described above.

Component (a1) is preferably a chain organopolysiloxane or organopolysiloxane resin composed of siloxane units selected from the M unit given by $[(CH_3)_3SiO_{1/2}]$, the $^{Vi}M$ unit given by $[(CH_2=CH)(CH_3)_2SiO_{1/2}]$, the $^{Vi}D$ unit given by $[(CH_2=CH)(CH_3)SiO_{2/2}]$, the M unit given by $[(CH_3)_3SiO_{1/2}]$, the D unit given by $[(CH_3)_2SiO_{2/2}]$, the T unit given by $[(CH_3)SiO_{3/2}]$, and the $^{Ph}T$ unit given by $[(C_6H_5)SiO_{3/2}]$, and is more specifically exemplified by organopolysiloxane resin comprising the $^{Vi}M$ unit and T unit, organopolysiloxane resin comprising the $^{Vi}M$ unit and the $^{Ph}T$ unit, and organopolysiloxane resin comprising the M, $^{Vi}D$, D, and $^{Ph}T$ units. These organopolysiloxane resins are particularly preferred in the present invention as the carrier for the metal nanoparticles in the metal particle dispersion structure because they form a polysiloxane matrix having a three-dimensional crosslinked structure by an addition reaction.

Component (a1) can otherwise be exemplified by the following: trimethylsiloxy-terminated dimethylpolysiloxane-methylvinylpolysiloxane copolymers, vinyldimethylsiloxy-terminated dimethylpolysiloxanes, vinyldimethylsiloxy-terminated dimethylpolysiloxane-methylvinylpolysiloxane copolymers, trimethylsiloxy-terminated dimethylpolysiloxane-methyhexenylpolysiloxane copolymers, hexenyldimethylsiloxy-terminated dimethylpolysiloxanes, hexenyldimethylsiloxy-terminated dimethylpolysiloxane-methylhexenylpolysiloxane copolymers, trimethylsiloxy-terminated dimethylsiloxane-methylvinylsiloxane-methylphenylsiloxane copolymers, vinyldimethylsiloxy-terminated dimethylsiloxane-methylvinylsiloxane-methylphenylsiloxane copolymers, vinyldimethylsiloxy-terminated dimethylsiloxane-methylphenylsiloxane copolymers, vinyldimethylsiloxy-terminated dimethylsiloxane-diphenylsiloxane copolymers, trimethylsiloxy-terminated dimethylsiloxane-methylvinylsiloxane-diphenylsiloxane copolymers, trimethylsiloxy-terminated dimethylsiloxane-methylhexenylsiloxane-methylphenylsiloxane copolymers, hexenyldimethylsiloxy-terminated dimethylsiloxane-methylhexenylsiloxane-methylphenylsiloxane copolymers, hexenyldimethylsiloxy-terminated dimethylsiloxane-methylphenylsiloxane copolymers, hexenyldimethylsiloxy-terminated dimethylsiloxane-diphenylsiloxane copolymers, and trimethylsiloxy-terminated dimethylsiloxane-methylhexenylsiloxane-diphenylsiloxane copolymers.

Component (a2), an organohydrogenpolysiloxane that has at least two silicon-bonded hydrogen atoms per molecule, functions as a crosslinker for component (a1) wherein its silicon-bonded hydrogen atoms undergo a hydrosilylation reaction with the alkenyl in components (A) and (B). Moreover, since component (a2) contains the Si—H bond in its molecule, it also falls under the subordinate concept of (b1) a silicon-type compound that exhibits a reducing activity, vide infra.

Component (a2) must contain at least two silicon-bonded hydrogen atoms in each molecule in order to function as a crosslinker for component (a1) and preferably contains at least three silicon-bonded hydrogen atoms in each molecule.

Component (a2) is preferably a liquid at ambient temperature from the standpoint of ease of mixing with the other components. Its viscosity at 25° C. is preferably 1 to 1,000 mPa·s and more preferably is 5 to 500 mPa·s. There are no limitations on the molecular structure of component (a2), and it may be, for example, straight chain, branched chain, resinous, or cyclic. The bonding position of the silicon-bonded hydrogen in the component (a2) molecule is not particularly limited, and the silicon-bonded hydrogen may be bonded, for example, in molecular chain terminal position or side chain position or at both positions.

More specifically, each molecule of component (a2) preferably contains at least two SiH-functional siloxane units selected from the M unit given by $[H(CH_3)_2SiO_{1/2}]$ and the D unit given by $[H(CH_3)SiO_{2/2}]$. In addition, the organopolysiloxane comprising component (a1) can contain the M unit given by $[R_3SiO_{1/2}]$, the D unit given by $[R_2SiO_{2/2}]$, the T unit given by $[RSiO_{3/2}]$, and the Q unit given by $[SiO_{4/2}]$. R in the formulas encompasses the same groups as described above, wherein at least 50 mole % of the total number of these groups is preferably $C_{1-8}$ alkyl or phenyl.

In even more specific terms, the organopolysiloxane represented by the following average compositional formula can be used for component (a2).

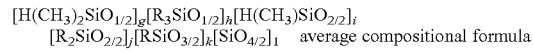

In the formula, g, h, i, j, k, and l in this formula each represent a positive number having a value greater than or equal to 0 and less than 1 and satisfy the relationship g+h+i+j+k+l=1. R encompasses the same groups as described above.

Component (a2) is preferably a chain organopolysiloxane or organopolysiloxane resin composed of siloxane units selected from the M unit given by [(CH$_3$)$_3$SiO$_{1/2}$], the $^H$M unit given by [H(CH$_3$)$_2$SiO$_{1/2}$], the $^H$D unit given by [H(CH$_3$)SiO$_{2/2}$], the M unit given by [(CH$_3$)$_3$SiO$_{1/2}$], the D unit given by [(CH$_3$)$_2$SiO$_{2/2}$], the $^{Ph2}$D unit given by [(C$_6$H$_5$)$_2$SiO$_{2/2}$], the T unit given by [(CH$_3$)SiO$_{3/2}$], and the $^{Ph}$T unit given by [(C$_6$H$_5$)SiO$_{3/2}$], and is more specifically exemplified by organopolysiloxane resin comprising the $^H$M unit and T unit, organopolysiloxane resin comprising the $^H$M unit and the $^{Ph}$T unit, organopolysiloxane resin comprising the $^H$M, M, $^H$D, D, $^{Ph2}$D, and T units, and chain organopolysiloxane comprising the M, $^H$D, and D units.

Component (a2) can otherwise be exemplified by the following: methylhydrogenpolysiloxane endblocked by trimethylsiloxy at both terminals, dimethylsiloxane-methylhydrogensiloxane copolymer endblocked by trimethylsiloxy at both terminals, dimethylsiloxane-methylhydrogensiloxane copolymer endblocked by dimethylhydrogensiloxy at both terminals, cyclic methylhydrogenoligosiloxane, cyclic methylhydrogensiloxane-dimethylsiloxane copolymer, dihydrogentetramethyldisiloxane, tris(dimethylhydrogensiloxy)methylsilane, and tetra(dimethylhydrogensiloxy)silane.

Component (a2) is incorporated in an amount that provides a value of 1 to 60 for the molar ratio of silicon-bonded hydrogen (SiH) in component (a2) per 1 mole alkenyl in component (a1) (that is, the [SiH/alkenyl] molar ratio) and preferably is incorporated in an amount that provides a value of 10 to 40 for this molar ratio.

Component (a3) is a hydrosilylation reaction catalyst and is a catalyst for promoting the addition reaction between component (a1) and component (a2). Component (a3) can be exemplified by platinum-type catalysts, rhodium-type catalysts, and palladium-types catalysts and is preferably a platinum-type catalyst. The platinum-type catalysts can be exemplified by chloroplatinic acid, alcohol-modified chloroplatinic acid, olefin complexes of platinum, ketone complexes of platinum, vinylsiloxane complexes of platinum, platinum tetrachloride, finely divided platinum powder, solid platinum supported on a carrier such as alumina or silica, platinum black, alkenylsiloxane complexes of platinum, carbonyl complexes of platinum, and powdered thermoplastic organic resin (e.g., methyl methacrylate resin, polycarbonate resin, polystyrene resin, silicone resin, and so forth) that incorporates a platinum-type catalyst as described in the preceding. The following are particularly preferred among the preceding: chloroplatinic acid/divinyltetramethyldisiloxane complexes, chloroplatinic acid/tetramethyltetravinylcyclotetrasiloxane complexes, and platinum/alkenylsiloxane complexes such as platinum/divinyltetramethyldisiloxane complexes, platinum/tetramethyltetravinylcyclotetrasiloxane complexes, and so forth.

Component (a3) is incorporated in what is known as a catalytic quantity. More specifically, this is 1 to 1,000 ppm as the weight of platinum group metal and more preferably is 5 to 200 ppm. The cure rate is substantially slowed at less than 1 ppm as the weight of platinum group metal. No additional effect in terms of promoting the required reaction can be expected for more than 1,000 ppm as the weight of platinum group metal, making this uneconomical in most cases.

The hydrosilylation catalyst comprising component (a3) is preferably dispersed in a nonreactive organic solvent and added to the system in this form, and particularly preferably is dispersed in a nonreactive organic solvent and then added to the system dropwise. This organic solvent can be exemplified by alcohol solvents such as isopropyl alcohol; aromatic hydrocarbon solvents such as toluene and xylene; ether solvents such as dioxane and THF; aliphatic hydrocarbon solvents; ester solvents; ketone solvents; and chlorinated hydrocarbon solvents. In a most preferred embodiment, a toluene solution of platinum/1,3-divinyl-1,1,3,3-tetramethyldisiloxane complex can be used by dropwise addition to the system. The time required for this dropwise addition will vary with the scale of the reaction; however, viewed from the perspective of preventing an overly vigorous reaction, dropwise addition at a constant rate over 0.5 to 5 hours is preferred.

Component (B) is a metal particle that has an average primary particle size, as determined by electron microscopic observation, in the range of 3 to 1,000 nm. In the present invention, these metal particles are characteristically metal particles obtained by mixing (b1) at least one organosilicon compound that has at least one silicon-bonded hydrogen atom per molecule
and
(b2) at least one metal compound having the compositional formula:

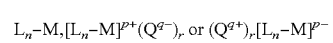

(wherein M is the cation of a metal that has a standard oxidation-reduction potential greater than 0.00 V, L is an organic ligand, Q is a counterion, n is the number of organic ligands L coordinated per metal atom, and p, q, and r are numbers that satisfy the relationship p=q×r)
to uniformity in
(b3) cyclic or chain dimethylpolysiloxane that has a viscosity at 25° C. of no greater than 1000 mPa·s or at least one nonreactive organic solvent.

An advantage accruing to these metal particles is that they can be easily produced in an industrial manufacturing process. In particular, not only can these metal particles be produced separately from component (A), but when the aforementioned polymer precursor (=component (a)) is soluble in component (b3), the metal particles can be formed in the polymer yielded by the polymerization of component (a) by mixing components (b1) to (b3) to uniformity with component (a). As a result, the metal particles become uniformly dispersed in and supported by a polymeric structure (polymer matrix) and a metal particle dispersion structure of metal nanoparticles with an average particle size of 3 to 1,000 nm uniformly dispersed in polymer can thus be produced quite easily.

Component (B) is a metal particle whose average primary particle size, as determined by electron microscopic observation, is in the range of 3 to 1,000 nm (also referred to hereafter as "metal nanoparticles"), and the metal constituting these metal particles is at least one metal that has a standard oxidation-reduction potential larger than 0.00 V. This metal can be specifically exemplified by at least one metal selected from the group consisting of copper (Cu), silver (Ag), gold (Au), palladium (Pd), and platinum (Pt).

The average primary particle size of these metal particles is measured by electron microscopic observation. Observation of the primary particles by electron microscopy can be carried out by 100,000X to 300,000X enlargement by a known method. In particular, the use of transmission electron microscopy is preferred for the observation of particle size and shape. The average particle size of the metal particles of the present invention is in the range of 3 to 1,000 nm based on a consideration of what is known as the particle effects of metal nanoparticles and is preferably in the range of 5 to 500 nm based on a consideration of optical functions, surface-modification functions, thermal properties, and so forth. Even 10-100 nm metal particles can be easily produced in the present invention.

The metal particles under consideration can be readily obtained by carrying out the reduction of component (b2) by component (b1) by mixing the at least one organosilicon compound that contains the Si—H bond (component (b1)) and the metal compound (component (b2)) to uniformity in the dimethylpolysiloxane or nonreactive organic solvent (component (b3)).

This reduction reaction can be carried out at the same time as the reaction that forms the polymeric structure (polymer matrix). In addition, a mixture of components (b1) to (b3) and a hydrophobic polymer precursor can also form the metal particles (component (B)) by this reduction reaction when present in emulsion particles formed by emulsification in water using an emulsifying agent and mechanical force.

Component (b1) is at least one organosilicon compound that contains at least one silicon-bonded hydrogen atom in each molecule and exhibits a reducing activity due to the presence of the Si—H bond in the molecule. Thus, component (b1) is a reducing agent. In the present invention, the metal compound containing specific organic ligands (component (b2)) is reduced by component (b1) in component (b3) (=medium), thereby forming zero-valent metal particles.

In addition to the organohydrogenpolysiloxane that has at least two silicon-bonded atoms in each molecule (component (a2)), component (b1) can be selected from polysilanes, polycarbosilanes, polysiloxanes, and polysilazanes, in each case that have at least one Si—H bond.

Suitable examples of component (b1) are the same organohydrogenpolysiloxane as described for component (a2); organopolysiloxane resin comprising the $^H$M unit and $^{Ph}$T unit; organopolysiloxane resin comprising the $^H$M unit, M unit, $^H$D unit, D unit, and $^{Ph}$T unit; chain organopolysiloxane comprising the M unit, $^H$D unit, and D unit; methylhydrogenpolysiloxane endblocked by trimethylsiloxy at both terminals; dimethylsiloxane-methylhydrogensiloxane copolymer endblocked by trimethylsiloxy at both terminals; and dihydrogentetramethyldisiloxane.

Component (b2) is one of the characteristic components of the present invention and is at least one metal compound that has a structure given by the compositional formula:

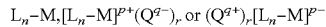

in which n of organic ligands (L) are coordinated to a metal M that has a specific standard oxidation-reduction potential. Through the use of this particular metal compound as component (b2), the metal ion, which bears a positive charge prior to reduction, can as described below be dissolved in the medium (=component (b3)) in the form of a metal complex. Metal particles having an average particle size of 3-1,000 nm can be readily produced and elaborated as a uniform dispersion in component (b3) by the reduction of this dissolved metal complex by component (b1). This also makes it possible to readily bring about a uniform dispersion of the metal particles in and their support by a polymeric structure (polymer matrix).

M in the aforementioned compositional formula is the cation of a metal that has a standard oxidation-reduction potential greater than 0.00 V. Here, the standard oxidation-reduction potential is the standard oxidation-reduction potential where the electrode potential of the standard hydrogen electrode shown by the half-reaction equation $2H^+ + 2e^- \Leftrightarrow H_2$ is defined as 0.00 V, and M is reduced to the zero-valent metal by the reducing activity of the Si—H bond in component (b1). Accordingly, as long as M has a standard oxidation-reduction potential larger than that of hydrogen ($H_2$), there are no limitations on its type or on the oxidation state of the cation, and M can be exemplified by the monovalent to pentavalent cations of one or more metals selected from the group consisting of antimony (Sb), bismuth (Bi), copper (Cu), mercury (Hg), silver (Ag), gold (Au), palladium (Pd), and platinum (Pt). $Cu^{2+}$, $Ag^+$, $Au^{3+}$, $Pt^{5+}$, and mixtures of these metal ions are even more suitable, while the copper ion ($Cu^{2+}$) is the most suitable.

L is an organic ligand, and it is used—through the formation of a metal complex of the metal cation M and n ligands (the structure represented by $[L_n–M]$, $[L_n–M]^{p+}$ or $[L_n–M]^{p-}$) to bring about the uniform dissolution of the metal cation M in component (b3). Organic ligands that provide a metal complex soluble in organic solvents can be selected for the organic ligand L, and examples thereof are $C_{2-20}$ alcohols, thiols, aliphatic chain amines, aromatic amines, aliphatic cyclic amines, aromatic amines, diketones, ketoesters, hydroxyketones, and carboxylate anions, but there is no limitation to the preceding. The number of ligands n will vary as a function of the identity of M and the denticity of L, but is generally 1 to 6.

L in the present invention is preferably a carboxylate anion or aliphatic amine because this avoids secondary reactions with component (b2) and provides an excellent stability for the metal complex and an excellent solubility in component (b3).

The following are particularly suitable for L: $C_{2-21}$ carboxylate anions given by $R^1$—COO$^-$ ($R^1$ in the formula is $C_{1-20}$ alkyl), $C_{4-20}$ alkylamines given by $R^2$—$NH_2$ ($R^2$ in the formula is $C_{4-20}$ alkyl), alkylenediamines given by $H_2N$—$R^3$—$NH_2$ ($R^3$ in the formula is $C_{2-20}$ alkylene), diketones, and the conjugate bases of diketones.

L can be more specifically exemplified by aminoalcohols such as aminoethyl alcohol; primary alkylamines such as methylamine, ethylamine, propylamine, butylamine, hexylamine, octylamine, and dodecylamine; aromatic amines such as phenylamine and benzylamine; polyamines such as ethylenediamine, propylenediamine, hexylenediamine, pentane-1,2,5-triamine, and benzene-1,2,4,5-tetramine; aliphatic cyclic amines such as pyridine, 4-methylpyridine, pyridazine, pyrimidine, methylpiperidine, quinoline, isoquinoline, pyrrole, pyrazole, imidazole, 2,4,5-triphenylimidazole, indole, purine, bipyridine, collidine, and beta-picoline; diketones such as acetylacetone, diacetyl, and benzoylacetone and the conjugate bases thereof; ketoesters such as ethyl acetoacetate, ethyl pyruvate, ethyl benzoylacetate, and ethyl benzoylformate; hydroxyketones such as hydroxyacetone, 1-hydroxy-3-butanone, and diacetone alcohol; and $C_{5-10}$ alkylcarboxylate anions ($R^1$—COO$^-$).

Q is a counter-ion in those instances in which $[L_n–M]$ bears a charge and is an inorganic or organic ion that has a charge opposite the charge on the metal complex composed of the metal cation M and organic ligand L as described above. In general, the positively charged counter-ion Q can be exemplified by cations selected from the group consisting of the proton ($H^+$), ammonium ion ($NH_4^+$), sodium ion ($Na^+$), and potassium ion ($K^+$), while the negatively charged counter-ion Q can be exemplified by anions selected from the group consisting of the nitrate ion ($NO_3^-$), chloride ion ($Cl^-$), sulfate ion ($SO_4^{2-}$), and perchlorate ion ($ClO_4^-$); however, Q is not limited to the preceding. Q can also be exemplified by the counter-ions in the metal salts described below.

Given that Q is a counter-ion, the sum of the charges for the compositional formula as a whole in the compositional formulas [L$_n$–M]$^{p+}$(Q$^{q-}$)$_r$ or ($_Q$$^{q+}$)$_r$[L$_n$–M]$^{p-}$ is 0. Accordingly, p, q, and r are numbers that satisfy the relationship p=q×r. Q is not required when [L$_n$–M] is uncharged.

The metal complex given by L$_n$ M can be exemplified by acetylacetone platinum (II) (Pt(C$_5$H$_7$O$_2$)$_2$) and silver (I) laurate (AgOCOC$_{10}$H$_{21}$).

Component (b2) as described above can be readily obtained most suitably by mixing a metal salt that contains Cu$^{2+}$, Ag$^+$, Au$^{3+}$, Pt$^{5+}$, or a mixture of these metal ions in component (b3), vide infra, with C$_{2-21}$ carboxylic acid given by R$^1$—COOH(R$^1$ in the formula is C$_{1-20}$ alkyl), C$_{4-20}$ primary alkylamine given by R$^2$—NH$_2$ (R$^2$ in the formula is C$_{4-20}$ alkyl), C$_{2-20}$ secondary alkylamine given by R$^{21}$R$^{22}$NH (R$^{21}$ and R$^{22}$ in the formula are each independently selected from C$_{2-20}$ alkyl), tertiary alkylamine given by R$^{22}$R$^{23}$R$^{24}$N (R$^{22}$, R$^{23}$, and R$^{24}$ in the formula are each independently selected from C$_{2-20}$ alkyl), alkylenediamine given by H$_2$N—R$^3$—NH$_2$ (R$^3$ in the formula is C$_{4-20}$ alkylene), or a diketone (e.g., acetylacetone, diacetyl, benzoylacetone).

Metal salts that contain the aforementioned metal ion M of platinum (Pt), gold (Au), palladium (Pd), silver (Ag), or copper (Cu) are known and are not particularly limited. The copper salts can be exemplified by copper chloride, copper hydroxide, copper bromide, copper iodide, copper sulfate, copper nitrate, and copper acetate. Similarly, the silver salts can be exemplified by silver chloride, silver nitrate, silver acetate, AgBF$_4$, AgClO$_4$, AgPF$_6$, AgB(C$_6$H$_5$)$_4$, and Ag(CF$_3$SO$_3$). The palladium salts can be exemplified by palladium chloride, palladium bromide, palladium iodide, palladium acetate, palladium sulfate, palladium nitrate, and Pd(OCOCF$_3$)$_2$. The platinum salts can be exemplified by platinous chloride, platinic chloride, chloroplatinic acid, and potassium chloroplatinate. The gold salts can be exemplified by NaAuCl$_4$, HAuCl$_4$, NaAuCl$_2$, NaAu(CN)$_2$, NaAu(CN$_4$), and so forth. Copper acetate, silver nitrate, and NaAuCl$_4$ are most preferred in the present invention.

Component (b3) is a cyclic or chain dimethylpolysiloxane that has a viscosity at 25° C. no greater than 1000 mPa·s or is at least one nonreactive organic solvent. Component (b3) is a medium that, by bringing about the uniform dissolution of components (b1) and (b2), supports the formation of uniform metal microparticles by the reduction reaction.

This component (b3) may be a nonreactive organic solvent, for example, an alcohol solvent such as methanol, ethanol, isopropyl alcohol, and so forth; an aromatic hydrocarbon solvent such as toluene, xylene, and so forth; an ether solvent such as dioxane, THF, and so forth; an aliphatic hydrocarbon solvent; an ester solvent; a ketone solvent; or a chlorinated hydrocarbon solvent.

Component (b3) may also be a cyclic or chain dimethylpolysiloxane that has a viscosity at 25° C. no greater than 1000 mPa·s, which can be exemplified by octamethylcyclotetrasiloxane (D4), decamethylcyclopentasiloxane (D5), dimethylpolysiloxane endblocked at both molecular chain terminals by trimethylsiloxy, methylphenylpolysiloxane endblocked at both molecular chain terminals by trimethylsiloxy, α,ω-dihydroxypolydimethylsiloxane, α,ω-dimethoxypolydimethylsiloxane, hexamethyldisiloxane, and octamethyltrisiloxane.

The amount of component (b1) incorporation is not particularly limited as long as component (b1) is incorporated in an amount that can reduce the metal cation in component (b2) to the zero-valent metal; however, the amount of component (b1) is preferably in excess with respect to the amount of component (b2). Thus, the molar ratio of the silicon-bonded hydrogen (Si—H) in component (b1) to 1 mole of the metal cation in component (b2) is preferably at least 10, and this molar ratio is more preferably 100 to 100,000. The amount of component (b3) incorporation is not particularly limited as long as component (b3) is incorporated in an amount that can uniformly dissolve components (b1) and (b2); however, component (b3) is preferably used at 25 to 1,000 weight parts per 100 weight parts of the sum of the weights of components (b1) and (b2). Viewed from the perspective of the uniformity of the resulting metal nanoparticles, the reaction of components (b1) and (b2) is particularly preferably carried out by dissolving each of these components separately in component (b3) and then mixing to homogeneity. The post-reaction composition yielded by the reduction reaction is a metal particle dispersion fluid in which metal particles having an average particle size of 3 to 1,000 nm are stably dispersed in component (b3), and this can be directly incorporated into component (A).

The metal particle dispersion structure in the present invention is characterized in that 0.005 to 100 weight parts metal particles having an average primary particle size of 3 to 1,000 nm, as determined by electron microscopic observation, are dispersed in 100 weight parts component (A), which is a polymer, but there are no particular limitations on the procedure for incorporating the metal particles obtained by the above-described method in component (A). However, in a very suitable procedure, the metal particle dispersion structure—having been preliminarily prepared in at least one nonreactive organic solvent or cyclic or chain dimethylpolysiloxane that has a viscosity at 25° C. no greater than 1000 mPa·s (component (b3))—is mixed into component (a) (precursor for component (A)) and component (a) is polymerized to yield a metal particle dispersion structure in which the metal particles are dispersed in the component (A) polymer.

A metal particle dispersion structure of the present invention—in which 0.005 to 100 weight parts (B) metal particles having an average primary particle size, as determined by electron microscopic observation, in the range of 3 to 1,000 nm are dispersed in 100 weight parts component (A) (polymer)—can be obtained by mixing all of components (a) and (b1) to (b3) and reacting. The metal particle dispersion structure of the present invention preferably is a metal particle dispersion structure in which 0.1 to 50 weight parts (B) metal particles having an average primary particle size, as determined by electron microscopic observation, in the range of 3 to 1,000 nm are uniformly dispersed in 100 weight parts component (A) (polymer). In a more preferred metal particle dispersion structure, 0.2 to 30 weight parts (B) metal particles having an average primary particle size, as determined by electron microscopic observation, in the range of 3 to 1,000 nm are uniformly dispersed in 100 weight parts component (A) (polymer).

In the particular case in which component (A) is organopolysiloxane obtained by an addition cure-type crosslinking reaction in the presence of a hydrosilylation catalyst, a metal particle dispersion structure in which (B) metal particles having an average primary particle size, as determined by electron microscopic observation, in the range of 3 to 1,000 nm are uniformly dispersed in a polymer matrix comprising organopolysiloxane, can be obtained by mixing the above-described components (a1), (a2), (b2), (b3), and (a3) to homogeneity and forming the organopolysiloxane by carrying out an addition cure-type crosslinking reaction.

Thus, a metal particle dispersion structure according to the present invention can be obtained by mixing (a1) organosilane that has at least two alkenyl groups per molecule and/or organosiloxane that has at least two alkenyl groups per molecule, (a2) organohydrogenpolysiloxane that has at least two silicon-bonded hydrogen atoms per molecule, (b2) at least one metal compound given by compositional formula (1), and
(b3) cyclic or chain dimethylpolysiloxane that has a viscosity at 25° C. no greater than 1000 mPa·s and/or at least one organic solvent to homogeneity and carrying out a crosslinking reaction in the presence of
(a3) a hydrosilylation reaction catalyst.

A suitable amount of component (a2) addition for the metal particle dispersion structure of the present invention is the range that provides a value of 0.1 to 10 for the molar ratio of silicon-bonded hydrogen (Si—H) in component (a2) per 1 mole alkenyl in component (a1). A suitable amount of component (b2) addition is 0.1 to 10 weight parts per 100 weight parts component (a1). A suitable amount of component (b3) addition is 10 to 100 weight parts per 100 weight parts component (a1), but there is no particular limitation on the amount of component (b3) addition as long as this component is added in an amount sufficient to uniformly dissolve each of the components. A suitable amount of component (a3) addition is an amount that provides 5 to 500 ppm with reference to the amount of the composition as a whole.

The metal particle dispersion structure of the present invention can be obtained by the following steps. In the first step, component (b2) uniformly dissolved in component (b3) is added to component (a1) with mixing to uniformity. In the second step, component (a2) is added with mixing to uniformity. At this point, metal nanoparticles form in a uniformly dispersed state in the mixture, although this also depends on the type of metal. In the final step, component (a3) (catalyst) is added to the mixture with mixing followed by heating to effect curing; volatiles such as component (b3) are removed in this step by, for example, heating and reducing the pressure. This metal particle dispersion structure accrues the advantage of enabling facile mass production in an industrial manufacturing process.

The usable life until formation of the metal particle dispersion structure due to cure of the composition can be extended and the storage stability can be improved by the addition of a hydrosilylation reaction retarder to the composition comprising components (a1), (a2), (b2), (b3), and (a3). Such a composition can be used to produce an article that has a coating film composed of the metal particle dispersion structure and is thus very useful as a coating agent.

The hydrosilylation reaction retarder can be exemplified by acetylenic compounds, ene-yne compounds, organonitrogen compounds, organophosphorus compounds, and oxime compounds. Specific examples are alkynyl alcohols such as 3-methyl-1-butyn-3-ol, 3,5-dimethyl-1-hexyn-3-ol, 3-methyl-1-pentyn-3-ol, 1-ethynyl-1-cyclohexanol, and phenylbutynol; ene-yne compounds such as 3-methyl-3-penten-1-yne and 3,5-dimethyl-1-hexyn-3-ene; methylalkenylcyclosiloxanes such as 1,3,5,7-tetramethyl-1,3,5,7-tetravinylcyclotetrasiloxane and 1,3,5,7-tetramethyl-1,3,5,7-tetrahexenylcyclotetrasiloxane; benzotriazole; and tris(1,1-dimethyl-2-propynoxy)methylsilane.

There are no particular limitations on the shape of the metal particle dispersion structure of the present invention, and it may be sheet-shaped, pellet-shaped, particulate, fiber-shaped, or film-shaped. The metal particle dispersion structure may be molded into a specific shape prior to curing or may be molded after curing. Film-shaped and particulate are particularly suitable shapes for the metal particle dispersion structure of the present invention.

A film-shaped metal particle dispersion structure can be obtained by coating the pre-cure metal particle dispersion structure out into a thin film and then curing and can also be obtained by molding the metal particle dispersion structure after curing. The film-shaped metal particle dispersion structure is preferably a film having a thickness of 0.1 μm to 10,000 μm, more preferably a film having a thickness of 1 to 5,000 μm, and most preferably a film having a thickness of 50 to 3,000 μm.

A film-shaped metal particle dispersion structure can be obtained by coating a composition comprising components (a1), (a2), (b2), (b3), and (a3) (referred to below as the crosslinkable organopolysiloxane composition) into a thin-film form and curing at room temperature or with the application of heat. The method for applying this composition is not particularly limited and can be exemplified at an industrial level by gravure coating, offset coating, offset gravure coating, roll coating, reverse roll coating, air knife coating, curtain coating, and comma coating.

All or a portion of the surface of a substrate can be coated with the metal particle dispersion structure by applying the aforementioned crosslinkable organopolysiloxane composition on a tape-shaped substrate or sheet-shaped substrate and curing at room temperature or by the application of heat at a temperature of 50 to 200° C. The type of substrate can be exemplified by paperboard, cardboard, clay-coated paper, polyolefin-laminated paper and particularly polyethylene-laminated paper, synthetic resin films, natural-fiber fabrics and textiles, synthetic-fiber fabrics and textiles, artificial leather fabrics, and metal foils. Synthetic resin films are particularly preferred, and the synthetic resin can be exemplified by polyimide, polyethylene, polypropylene, polystyrene, polyvinyl chloride, polycarbonate, polyethylene terephthalate, and nylon. In those instances were heat resistance is a particular requirement, heat-resistant synthetic resin films are preferred, such as polyimide, polyetheretherketone (PEEK), polyethylene naphthalate (PEN), liquid-crystal polyarylate, polyamideimide (PAI), polyestersulfone (PES), and so forth.

The particulate metal particle dispersion structure will now be described. A particulate metal particle dispersion structure having a desired particle size can be produced by grinding or milling the metal particle dispersion structure of the present invention using the application of mechanical force with, for example, a grinding mill, Hobart mixer, and so forth.

When component (A) is organopolysiloxane obtained by an addition cure-type crosslinking reaction in the presence of a hydrosilylation reaction catalyst, particulate metal particle dispersion structure of the present invention can also be readily obtained by a method in which a mixture of polymer precursor and the metal particle dispersion structure, vide infra, is emulsified in water and the crosslinking reaction is then carried out.

Thus, a mixture comprising
(a1) organopolysiloxane that has at least two alkenyl groups per molecule,
(a2) organohydrogenpolysiloxane that has at least two silicon-bonded hydrogen atoms per molecule,
(b2) at least one metal compound as represented by the following compositional formula

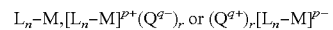

(wherein M is the cation of a metal that has a standard oxidation-reduction potential greater than 0.00 V, L is an organic ligand, Q is a counterion in those instances in which [$L_n$–M] carries a charge, n is the number of organic ligands L coordinated per metal atom, and p, q, and r are numbers that satisfy the relationship p=q×r), (b3) cyclic or chain dimethylpolysiloxane that has a viscosity at 25° C. no greater than 1000 mPa·s, and
(a3) hydrosilylation reaction catalyst
is emulsified in (D) water in the presence of (C) emulsifying agent, and a water-based dispersion containing the particulate metal particle dispersion structure of the present invention can then be obtained by carrying out the crosslinking reaction in the water.

The components (a1), (a2), (b2), (b3), and (a3) are the same as the previously described components. In the aforementioned method of producing the particulate metal particle dispersion structure, a mixture comprising components (a1), (a2), (b2), and (b3) is emulsified in (D) water in the presence of (C) emulsifying agent; component (a3) is added; and a water-based dispersion containing the particulate metal particle dispersion structure is then obtained by causing the hydrosilylation reaction to develop by heating the crosslinkable organopolysiloxane composition dispersed in the water or by holding it at room temperature.

There are no limitations on the method used to disperse the crosslinkable organopolysiloxane composition in the water (D) in the presence of the emulsifying agent (C) in this method of producing the particulate metal particle dispersion structure of the present invention; however, the use of the following mixing devices is preferred in order to efficiently bring about a dispersion in which the average particle size of the crosslinkable organopolysiloxane composition dispersed in the water is in the range of 0.1 μm to 1,000 μm and preferably in the range of 0.2 to 500 μm: homomixers, paddle mixers, Henschel mixers, colloid mixers, propeller stirrers, homodispersers, homogenizers, inline continuous emulsifiers, ultrasound emulsifiers, vacuum-type mixers, and so forth.

Component (C) is an emulsifying agent, and there are no particular restrictions on component (C) as along as it is an emulsifying agent as ordinarily used to produce oil-in-water emulsions in particular. It can be an ionic surfactant or a nonionic surfactant or the combination of an ionic surfactant with a nonionic surfactant. Viewed from the perspective of the stability and uniform dispersity of the oil-in-water emulsion prepared by mixing the water and crosslinkable organopolysiloxane composition, the combined use of at least one ionic surfactant with at least one nonionic surfactant is preferred.

The ionic surfactant can be an anionic surfactant, cationic surfactant, or amphoteric surfactant. The anionic surfactant can be exemplified by saturated and unsaturated higher aliphatic acid salts (for example, sodium laurate, sodium stearate, sodium oleate, sodium linolenate, and so forth), long-chain alkyl sulfate salts, alkylbenzenesulfonic acids (for example, hexylbenzenesulfonic acid, octylbenzenesulfonic acid, dodecylbenzenesulfonic acid, and so forth) and their salts, polyoxyalkylene alkyl ether sulfate salts, polyoxyalkylene alkenyl ether sulfate salts, the salts of polyoxyethylene alkyl sulfate esters, the salts of the alkyl esters of sulfosuccinic acid, polyoxyalkylene sulfosuccinate salts, the salts of the alkyl esters of polyoxyalkylene sulfosuccinic acid, the alkali metal salts of the polyoxyalkylene-modified dimethylpolysiloxane esters of sulfosuccinic acid, polyoxyalkylene alkylphenyl ether sulfate salts, long-chain alkanesulfonic acid salts, long-chain alkylsulfonates, polyoxyethylene alkylphenyl ether sulfate salts, polyoxyalkylene alkyl ether acetate salts, long-chain alkyl phosphate salts, polyoxyalkylene alkyl ether phosphate salts, acylglutamate salts, α-acylsulfonate salts, long-chain alkylsulfonate salts, alkylarylsulfonate salts, long-chain α-olefinsulfonate salts, alkylnaphthalenesulfonate salts, long-chain alkanesulfonic acid salts, long-chain alkyl or alkenyl sulfate salts, long-chain alkylamide sulfate salts, long-chain alkyl or alkenyl phosphate salts, alkylamide phosphate salts, alkyloylalkyltaurate salts, N-acylamino acid salts, sulfosuccinate salts, alkyl alkyl ether carboxylate salts, amide ether carboxylate salts, the salts of esters of α-sulfofatty acids, alanine derivatives, glycine derivatives, and arginine derivatives. The salts can be exemplified by alkali-metal salts such as the sodium salt and potassium salt, alkanolamine salts such as the triethanolamine salt, and the ammonium salt, with the sodium salt being preferred.

The cationic surfactants can be exemplified by alkyltrimethylammonium chloride, stearyltrimethylammonium chloride, lauryltrimethylammonium chloride, cetyltrimethylammonium chloride, beef tallow alkyltrimethylammonium chloride, behenyltrimethylammonium chloride, octyltrimethylammonium hydroxide, dodecyltrimethylammonium hydroxide, stearyltrimethylammonium bromide, behenyltrimethylammonium bromide, distearyldimethylammonium chloride, dicocoyldimethylammonium chloride, dioctyldimethylammonium chloride, di(POE)oleylmethylammonium (2EO) chloride, benzalkonium chloride, alkylbenzalkonium chloride, alkyldimethylbenzalkonium chloride, benzethonium chloride, stearyldimethylbenzylammonium chloride, lanolin-derived quaternary ammonium salts, diethylaminoethylamide of stearic acid, dimethylaminopropylamide of stearic acid, behenamidopropyldimethylhydroxypropylammonium chloride, stearoylcolaminoformylmethylpyridinium chloride, cetylpyridinium chloride, tall oil alkylbenzylhydroxyethylimidazolinium chloride, and benzylammonium salts.

The amphoteric surfactant can be exemplified by phospholipids, which are preferred. The phospholipids can be exemplified by lecithin, phosphatidylethanolamine, phosphatidic acid, phosphatidylinositol, phosphatidylserine, phosphatidylcholine, phosphatidylglycerol, sphingomyelin, and cardiolipin, and the hydrogenates of the preceding. Particularly preferred are the hydrogenated natural lecithins as yielded by the hydrogenation of, for example, soy lecithin, egg yolk lecithin, corn lecithin, cottonseed oil lecithin, rapeseed lecithin, and so forth.

The nonionic surfactants can be exemplified by polyoxyalkylene ethers, polyoxyalkylene alkyl ethers, polyoxyalkylene fatty acid esters, polyoxyalkylene fatty acid diesters, polyoxyalkylene resin acid esters, polyoxyalkylene (hardened) castor oils, polyoxyalkylene alkylphenols, polyoxyalkylene alkylphenyl ethers, polyoxyalkylenephenyl phenyl ethers, polyoxyalkylene alkyl esters, polyoxyalkylene alkyl esters, sorbitan fatty acid esters, polyoxyalkylene sorbitan alkyl esters, polyoxyalkylene sorbitan fatty acid esters, polyoxyalkylene sorbitol fatty acid esters, polyoxyalkylene glycerol fatty acid esters, polyglycerol alkyl ethers, polyglycerol fatty acid esters, sucrose fatty acid esters, fatty acid alkanolamides, alkyl glucosides, polyoxyalkylene fatty acid bisphenyl ethers, polypropylene glycol, polyether-modified silicones (e.g., polyoxyalkylene-modified diorganopolysiloxanes, polyglycerol-modified silicones, glycerol-modified silicones, saccharide-modified silicones), perfluoropolyether-type surfactants, polyoxyethylene·polyoxypropylene block copolymers, and alkyl polyoxyethylene·polyoxypropylene block copolymer ethers.

Component (D) is water, which desirably is pure and which can be exemplified by tap water, purified water, and mineral water. Water-soluble components (e.g., water-soluble surfactant and so forth) can be incorporated through their preliminary dispersion in the water.

Component (a2) is suitably incorporated in the water-based dispersion containing the particulate metal particle dispersion structure of the present invention in an amount that provides a value of 0.1 to 10 for the molar ratio of the silicon-bonded hydrogen (Si—H) in component (a2) per mole alkenyl in component (a1). Component (b2) is suitably incorporated at 0.1 to 10 weight parts per 100 weight parts component (a1). Component (b3) is suitably incorporated at 10 to 100 weight parts per 100 weight parts component (a1). Component (C) is used preferably at 0.1 to 20 weight parts and particularly preferably at 0.5 to 10 weight parts, in each case per 100 weight parts of the mixture comprising components (a1), (a2), (b2), and (b3). Component (D) may be incorporated in any amount and its amount of incorporation is thus not particularly limited, but it is incorporated preferably at 5 to 99 weight % and particularly preferably at 10 to 80 weight % of the water-based dispersion as a whole. The catalyst component (a3) is preferably incorporated in a quantity that provides 1 to 1000 ppm with reference to the total quantity of the water-based dispersion.

The particulate metal particle dispersion structure of the present invention can be obtained as a water-based dispersion containing the particulate metal particle dispersion structure by emulsifying the aforementioned crosslinkable organopolysiloxane composition in the water (D) in the presence of the surfactant (C); adding component (a3); and then causing the hydrosilylation reaction to develop by heating at 30 to 90° C. or standing at room temperature (10 to 25° C.).

Removal of the water from the water-based dispersion (containing the particulate metal particle dispersion structure) obtained by the method described above produces uniform spherical particles comprising a metal particle dispersion structure having a structure in which metal particles (component (B)) are uniformly dispersed in crosslinked organopolysiloxane.

The particulate metal particle dispersion structure of the present invention has an average particle size, as yielded by stereoscopic microscopic observation or dynamic light-scattering particle size distribution measurements, in the range of 0.01 to 1000 μm, and preferably has an average particle size as measured by laser diffraction·scattering of 0.1 to 10 μm. That is, a value of 0.1 to 10 μm is obtained for the average particle size determined by a particle size distribution measurement that yields the particle size distribution based on the frequency intensity distribution of the light scattered from the particles when a measurement sample comprising the particulate metal particle dispersion structure dispersed in a dispersion medium, is filled into a sample cell and the measurement sample is exposed to laser light.

The particulate metal particle dispersion structure and water-based dispersion thereof afforded by the production method of the present invention are well adapted for use as electronic materials, as a raw material for cosmetics, paints, and coating agents, as an additive component for thermoplastic resins, and as a starting material for fibers and textiles.

EXAMPLES

Practical examples and a comparative example are provided below in order to describe the present invention more specifically, but the present invention is not limited to the examples that follow.

Analysis of the metal nanoparticles and measurement of their optical properties were performed by the following methods in the reference examples, examples, and comparative example. In addition, the particle size of the particulate metal particle dispersion structure and the analysis and optical properties of the metal nanoparticles in the metal particle dispersion structure were measured by the following methods.

[Particle Size and Dispersion Structure of the Metal Nanoparticles]

The particle size and dispersion structure of the metal nanoparticles were identified in the practical examples, and comparative example by transmission electron microscopy as follows. Transmission electron microscope (model number): JEOL 2100F TEM Method of observation: The observation sample was thin sectioned using a cryogenic microtome at −60° C. and was placed on a carbon film-coated copper TEM grid to provide an electron transmissive specimen. The condition of this observation specimen was then observed using a bright-field transmission electron microscope (JEOL 2100F TEM) operating at 200 keV.

[Electronic State of the Metal Nanoparticles in the Metal Particle Dispersion Structure]

The electronic state of the metal nanoparticles in the metal particle dispersion structure was observed by x-ray photoelectron spectroscopic (XPS) analysis by measuring the energy of the photoelectrons produced when the surface of the sample was exposed to x-rays.

x-ray photoelectron spectroscopic (XPS) instrument: Kratos Analytical AXIS 165 ESCA (Shimadzu)
x-ray source: monochromated Al Kα x-rays (260 W)
measurement conditions: The metal spectrum and O 1, C 1 s, and Si 2p were measured by the three-point method. Charge compensation of the sample surface was carried out by low energy electron flood.

[State of the Metal Nanoparticles]

In the examples and comparative examples, the particulate status of the metal nanoparticles and the absence of a layer structure was confirmed by ultraviolet (UV) spectroscopic analysis by the presence in the UV-Vis spectrum of a sharp light absorption originating with surface plasmon resonance of the metal nanoparticles.

UV/VIS surface·interface spectrophotometer: UV 3100PC spectrophotometer (Shimadzu) Measurement conditions: The spectral transmittance of the metal nanoparticle-containing silicone resin film, or of the metal nanoparticles dispersed in organic solvent, was measured using the cited spectrophotometer; synthetic quartz was employed as the reference.

[Viscosity]

The viscosity of the individual organopolysiloxanes was measured at 25° C. by a specific rotor rotation rate (6 rotations/minute) with a No. 1 rotor installed in a digital display viscometer (Vismetron VDA 2 from Shibaura Systems Co., Ltd.).

Example 1

To a crosslinkable organopolysiloxane composition comprising (a1-1) 5.11 g of vinyl-functional organosiloxane resin given by the average compositional formula

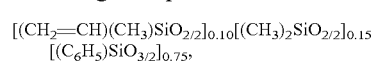

(a1-2) 2.02 g of vinyl-functional organosiloxane given by the molecular formula

(a1-3) 2.02 g of vinyl-functional organosiloxane given by the molecular formula

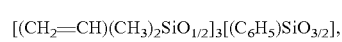

(a2) 5.74 g of organohydrogensiloxane resin given by the average compositional formula $$[H(CH_3)_2SiO_{1/2}]_{0.6}[(C_6H_5)SiO_{3/2}]_{0.4},$$

(a3) 0.002 g of platinum·divinyltetramethyldisiloxane complex,
(b3-1) 5.11 g of toluene, and
0.02 g of tris(1,1-dimethyl-2-propynoxy)methylsilane
was added a toluene solution of a metal complex, prepared by dispersing (b2) 0.05 g of silver laurate ($AgOCOC_{10}H_{21}$) in (b3-2) 2.0 g of toluene, and mixing to homogeneity was carried out by stirring.

The resulting mixture was coated on an alumina cup with a thickness of 4 mm and cured by heating at 150° C. for 1 hour to produce a metal dispersion structure of the present invention having a structure in which silver nanoparticles were uniformly dispersed in organopolysiloxane. The metal dispersion structure was yield as a dark yellow, 2 mm-thick film (film 1).

The UV spectrum of film 1 was measured: the results showed the presence of an absorption (wavelength=420 nm) originating in silver particle plasmons. FIG. 1 shows the results of the observation of film 1 with a transmission electron microscope. According to the results of the transmission electron microscopic observation, silver nanoparticles having an average primary particle size of 20 nm were observed to be uniformly distributed at the surface and in the interior of the polysiloxane resin in film 1. According to XPS, a spectrum showing the binding energy of the 3d electrons of the silver atom was observed in the vicinity of 368 eV, while this for the 2p electrons of the silicon atom was observed in the vicinity of 103 eV.

Example 2

For component (A),
(a1-1) 20.0 g of vinyl-functional organosiloxane resin given by the average formula $$[(CH_2=CH)(CH_3)_2SiO_{1/2}]_{0.25}[(C_6H_5)SiO_{3/2}]_{0.75},$$

(a2-1) 3.93 g of organohydrogensiloxane given by the molecular formula $$[H(CH_3)_2SiO_{1/2}]_2[(C_6H_5)_2SiO_{2/2}], \text{ and}$$

(a2-2) 3.93 g of organohydrogensiloxane given by the molecular formula $$[H(CH_3)_2SiO_{1/2}]_3[(C_6H_5)SiO_{3/2}],$$

were mixed to homogeneity. To this mixture was added a separately prepared toluene solution containing a gold (III)-hexylamine complex (prepared by the addition of (b3-1) 10.0 g of toluene to (b2) 0.25 g of $NaAuCl_4$ and 0.14 g of hexylamine ($C_6H_{13}NH_2$) with dissolution to homogeneity), and mixing to uniformity was carried out by stirring. The resulting fluid mixture was held for 2 hours at 80° C. and then returned to room temperature. To the resulting mixture were then added, with thorough mixing, (a3) 0.01 g of platinum divinyltetramethyldisiloxane complex, (b3-2) 10.0 g of toluene, and
0.1 g of tris(1,1-dimethyl-2-propynoxy)methylsilane.

The resulting mixture was coated on an alumina cup with a thickness of 4 mm and cured by heating at 150° C. for 1 hour to produce a metal dispersion structure of the present invention having a structure in which gold nanoparticles were uniformly dispersed in organopolysiloxane. The metal dispersion structure was yield as a violet-tinged, 2 mm-thick film (film 2).

The UV spectrum of film 2 was measured: the results showed the presence of an absorption (wavelength=520 nm) originating in gold particle plasmons. Observation of film 2 with a transmission electron microscope showed that gold nanoparticles having an average primary particle size of 10 nm were uniformly distributed at the surface and in the interior of the polysiloxane resin. According to XPS, a spectrum showing the binding energy of the 4f electrons of the gold atom was observed in the vicinity of 84 eV, while this for the 2p electrons of the silicon atom was observed in the vicinity of 103 eV.

Example 3

The following were mixed to homogeneity:
(a1-1) 5.11 g of vinyl-functional organosiloxane resin given by the average compositional formula $$[(CH_2=CH)(CH_3)SiO_{2/2}]_{0.10}[(CH_3)_2SiO_{2/2}]_{0.15}[(C_6H_5)SiO_{3/2}]_{0.75},$$

(a1-2) 2.02 g of vinyl-functional organosiloxane given by the molecular formula $$[(CH_2=CH)(CH_3)_2SiO_{1/2}]_2[(C_6H_5)_2SiO_{2/2}],$$

(a1-3) 2.02 g of vinyl-functional organosiloxane given by the molecular formula $$[(CH_2=CH)(CH_3)_2SiO_{1/2}]_3[(C_6H_5)SiO_{3/2}], \text{ and}$$

(a2) 5.74 g of organohydrogensiloxane resin given by the average formula $$[H(CH_3)_2SiO_{1/2}]_{0.6}[(C_6H_5)SiO_{3/2}]_{0.4}.$$

To this mixture was added a separately prepared toluene solution containing a copper (II)-hexylamine complex (prepared by the addition of (b3-1) 5 g of toluene to (b2) 0.05 g of copper chloride ($CuCl_2$) and 0.10 g of hexylamine ($C_6H_{13}NH_2$) with dissolution to homogeneity), and mixing to uniformity was carried out by stirring under nitrogen. The resulting mixture was held for 3 hours at 80° C. and then returned to room temperature. To the resulting mixture were then added (a3) 0.002 g of platinum·divinyltetramethyldisiloxane complex, (b3-2) 5.11 g of toluene, and 0.02 g of tris(1,1-dimethyl-2-propynoxy)methylsilane; mixing yielded a crosslinkable organopolysiloxane composition.

The resulting mixture was coated on an alumina cup with a thickness of 4 mm and cured by heating at 150° C. for 1 hour to produce a metal dispersion structure of the present invention having a structure in which copper nanoparticles were uniformly dispersed in organopolysiloxane. The metal dispersion structure was yield as a dark brown and 2 mm-thick film (film 3).

The UV spectrum of film 3 was measured: the results showed the presence of an absorption (wavelength=570 nm) originating in copper particle plasmons. Observation of film 3 with a transmission electron microscope showed that copper nanoparticles having an average primary particle size of 10 nm were uniformly distributed at the surface and in the interior of the polysiloxane resin.

Example 4

1.4 weight parts of dimethylsiloxane-methylhydrogensiloxane copolymer terminated at both molecular chain terminals by trimethylsiloxy-group (viscosity=30 mPa·s, silicon-bonded hydrogen content=0.5 weight %) was added as component (a2) to a mixture of (a1) 18.8 weight parts of dimethylpolysiloxane endblocked at both molecular chain terminals by dimethylvinylsiloxy (viscosity=400 mPa·s),
(b2) 0.15 weight part of silver acetate ($AgOCOCH_3$), and
(b3) 80 weight parts of dimethylpolysiloxane endblocked at both molecular chain terminals by trimethylsiloxy (viscosity=100 mPa·s)
and mixing to homogeneity was carried out by stirring for 1 hour. The resulting mixture was a dark yellow crosslinkable organopolysiloxane composition containing silver nanoparticles.

53 weight parts of a 3 weight % aqueous solution of polyoxyethylene nonylphenyl ether (HLB=13.1) (C and D-1) was then added to the entire amount of the aforementioned crosslinkable silicone composition. Then the composition was emulsified with a colloid mill. A water-based emulsion of the crosslinkable organopolysiloxane composition was obtained by dilution with an additional 50 weight parts of pure water (D) to the emulsified composition.

A separately prepared water-based emulsion of a platinum-type catalyst whose main component was (a3) a 1,3-divinyl-1,1,3,3-tetramethoxydisiloxane complex of platinum (average particle size of the platinum-type catalyst=0.05 platinum metal concentration=0.05 weight %) was mixed to homogeneity into the aforementioned water-based crosslinkable silicone composition emulsion, in an amount that provided 20 weight-ppm platinum metal with respect to the dimethylvinylsiloxy-endblocked dimethylpolysiloxane in the water-based crosslinkable silicone composition emulsion.

A water-based emulsion containing silver nanoparticle-containing crosslinked silicone particles (=particulate metal particle dispersion structure) is obtained by crosslinking reaction of the water-based crosslinkable silicone composition emulsion. The silver nanoparticle-containing crosslinked silicone particles (particulate metal particle dispersion structure) were further dispersed in liquid droplets of the (b3) trimethylsiloxy-endblocked dimethylpolysiloxane (viscosity=100 mPa·s), which were themselves emulsified in the water.

By removal of the water by evaporation, a dimethylpolysiloxane composition was obtained as a yellow cream-like form. Observation of this dimethylpolysiloxane composition with a stereoscopic microscope showed that the crosslinked silicone particles were uniformly dispersed in the silicone oil (component (b3)) and that these crosslinked silicone particles had a spherical shape.

More detailed observations with a transmission electron microscope revealed that a structure had been formed in which the silver nanoparticles were uniformly dispersed at the surface and in the interior of the spherical crosslinked silicone particles.

Example 5

With homogeneous dissolution of 1.00 g of (b2) $Cu(OCOCH_3)_2 \cdot H_2O$ and 1.01 g of in 15 g of (b3) toluene, a toluene solution containing a copper (II)-hexylamine complex was prepared. The toluene solution was added to 93.8 g of (a1) dimethylpolysiloxane endblocked by dimethylvinylsiloxy-group at both molecular chain terminals (viscosity=400 mPa·s), and mixing to homogeneity was carried out by stirring under nitrogen. The following were mixed into the resulting mixture to prepare a crosslinkable silicone composition: 6.2 g of dimethylsiloxane·methylhydrogensiloxane copolymer endblocked at both molecular chain terminals by trimethylsiloxy-group (viscosity=45 mPa·s, silicon-bonded hydrogen content=0.3 weight %) and 1.0 g of 1,3-dihydrogen-1,1,3,3-tetramethyldisiloxane. This was followed by holding for 3 hours at 80° C. and then returning to room temperature. 87 g of a 2.3 weight % aqueous solution of polyoxyethylene secondary alkyl ether (HLB=14.5, Sanyo Chemical Industries, Ltd., Sannonic SS120) was then added, followed by emulsification with a homodisperser (rotation rate=500 rpm) to yield a water-based emulsion of the crosslinkable silicone composition.

A separately prepared water-based emulsion of a platinum-type catalyst whose main component was (a3) a 1,3-divinyl-1,1,3,3-tetramethoxydisiloxane complex of platinum (average particle size of the platinum-type catalyst=0.05 μm, platinum metal concentration=0.05 weight %) was mixed to homogeneity into the aforementioned water-based crosslinkable silicone composition emulsion, in an amount that provided 20 weight-ppm platinum metal with respect to the dimethylvinylsiloxy-endblocked dimethylpolysiloxane in the water-based crosslinkable silicone composition emulsion.

A portion of this water-based dispersion was collected, and crosslinked silicone particles were obtained by removal of the water. These crosslinked silicone particles were dark brown, had an average particle size of about 50 μm. Those particles had a uniform structure in which copper nanoparticles were uniformly dispersed, and they were not sticky.

Comparative Example 1

The procedure of Example 1 was followed, but omitting the addition of the toluene solution of (b2) 0.05 g silver laurate ($AgOCOC_{10}H_{21}$) dissolved in (b3-2) 2.0 g toluene; the resulting crosslinkable organopolysiloxane composition was cured to yield a 2 mm-thick film that did not contain silver nanoparticles. This film was subjected to electroless plating by coating the film with a hydrogen silsesquioxane resin ($HSiO_{3/2})_n$ prepared by the method described in U.S. Pat. No. 3,615,272 followed by immersion in a mixed fluid comprising ethylenediamine and an aqueous silver nitrate ($AgNO_3$) solution. During this process, the surface of the film assumed a silver metal color and silver (Ag) was deposited on the film. FIG. 2 shows the appearance as observed with a scanning electron microscope (FESEM JEOL JSM-6335F Field Emission Scanning Electron Microscope, from JEOL Ltd., acceleration voltage=15 kV). The silver on this film has assumed an amorphous state. Moreover, unlike in Example 1, an absorption (wavelength=420 nm) assigned to that from silver nanoparticle plasmons was not observed.

Industrial Applicability

The metal particle dispersion structure described by the present invention—because it has a structure in which metal nanoparticles having an average particle size of 3 to 1,000 nm are uniformly dispersed and supported in a polymeric structure (polymer matrix)—can provide a polymer that has any of the various functions inherent to metal microparticles, for example, functions such as an antibacterial action, an anti-mold action, an anti-odor action, flame retardancy, a capacity to intercept ultraviolet rays, the ability to improve surface properties, the ability to impart aesthetic qualities, the ability to impart cosmetic, catalytic functions, electroconductivity, an antirust capacity, lubricity, magnetism, a light-emitting activity, a capacity to selectively absorb light, a heat absorption capacity, a heat conduction capacity, a heat radiating capacity, and so forth. High-performance polymer materials provided with such functionalities can be used in various sectors where technical properties can be utilized, such as fibers, films, binders, paints, adhesives, sensors, resins, electrical and electronic products, cosmetics, the automotive sector, glass coatings, food containers, hygiene products, and so forth. The methods of producing the metal particle dispersion structure described by the present invention have the advantage of enabling the facile large-scale production of this metal particle dispersion structure in an industrial production process and are very useful in that they enable product lines that utilize a metal particle dispersion structure described by the present invention to be supplied to the market in a stable and consistent manner.

Figure 1:
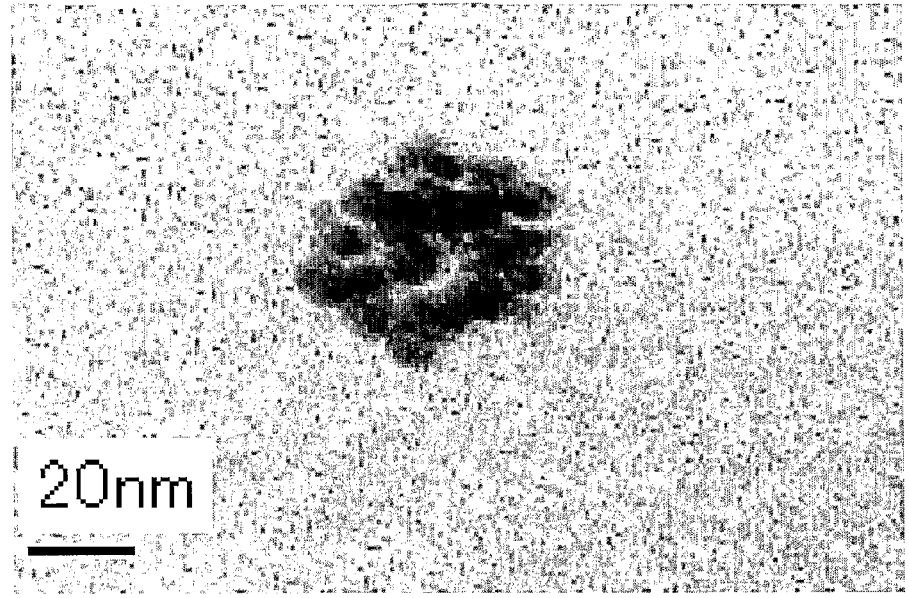
FIG. 1 is a photograph taken with a transmission electron microscope (TEM) of the silver nanoparticle in the silicone resin film obtained in Example 1.
Figure 2:
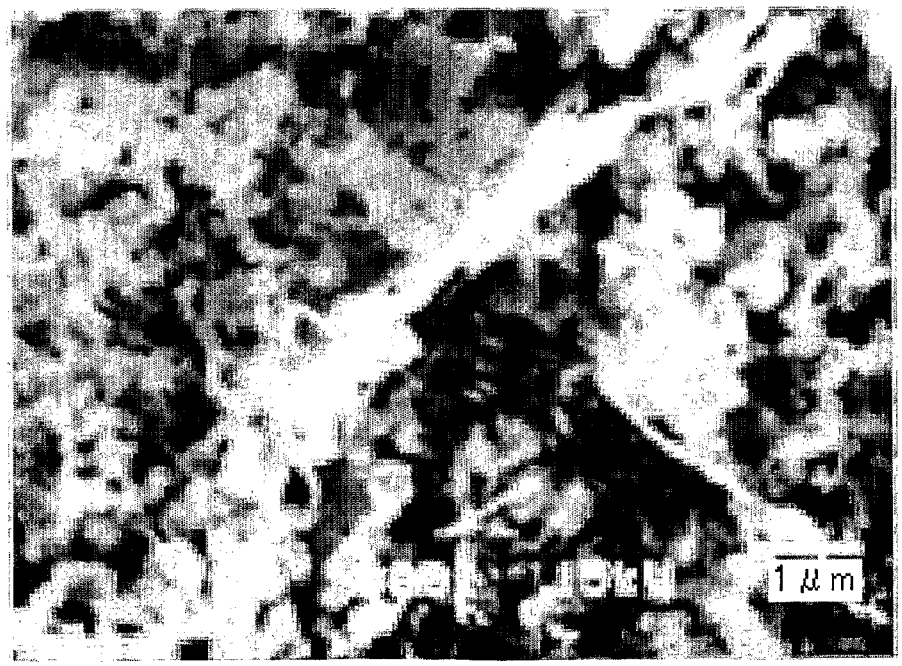
FIG. 2 is a photograph taken with a scanning electron microscope (SEM) of the surface of the silver deposition layer on a silicone resin film, as yielded in Comparative Example 1 by electroless plating by immersion in a mixed fluid comprising ethylenediamine and an aqueous solution of silver nitrate ($AgNO_3$).

The invention claimed is:

1. A metal particle dispersion structure comprising
(B) 0.005 to 100 weight parts of metal particles having an average primary particle size, as determined by electron microscopic observation, in the range of 3 to 1,000 nm dispersed in
(A) 100 weight parts of polymer yielded by the polymerization of
  (a) reactive functional group-containing polymer precursor,
wherein the metal particles are metal particles obtained by mixing
  (b1) at least one organosilicon compound that has at least one silicon-bonded hydrogen atom per molecule and
  (b2) at least one metal compound having the compositional formula (1) shown below

$L_nM, [L_nM]^{p+}(Q^{q-})_r,$ or $(Q^{q+})_r[L_nM]^{p-}$    compositional formula (1):

(wherein M is the cation of a metal that has a standard oxidation-reduction potential greater than 0.00 V and is selected from the group consisting of copper (Cu), silver (Ag), gold (Au), and platinum (Pt),
L is an organic ligand,
Q is a counter ion,
n is the number of organic ligands (L) coordinated per metal atom, and
p, q, and r are numbers that satisfy the relationship p=q×r.)
to uniformity in
  (b3) cyclic or chain dimethylpolysiloxane that has a viscosity at 25° C. of no greater than 1000 mPa·s or at least one organic solvent.

2. The metal particle dispersion structure according to claim 1, wherein component (a) is at least one organosilicon compound selected from crosslinkable organosilanes and/or organosiloxanes, and component (A) is an organosilicon-type polymer yielded by the crosslinking of said at least one organosilicon compound.

3. The metal particle dispersion structure according to claim 1, wherein L in the compositional formula (1) for component (b2) is at least one organic ligand selected from the group consisting of $C_{2-20}$ alcohols, thiols, aliphatic chain amines, aliphatic cyclic amines, aromatic amines, pyridine derivatives, diketones, ketoesters, hydroxyketones, and carboxylate anions.

4. A method of producing the metal particle dispersion structure of claim 1, comprising:
mixing the (a) reactive functional group-containing polymer precursor, the (b1) at least one organosilicon compound that has at least one silicon-bonded hydrogen per molecule, and the (b2) at least one metal compound having the compositional formula (1) to uniformity in the (b3) cyclic or chain dimethylpolysiloxane that has a viscosity at 25° C. no greater than 1000 mPa·s or at least one organic solvent; and
causing component (a) to undergo a crosslinking reaction.

5. The metal particle dispersion structure according to claim 1, wherein component (A) is organopolysiloxane obtained by crosslinking between
  (a1) organosilane that has at least two alkenyl groups per molecule and/or organosiloxane that has at least two alkenyl groups per molecule and
  (a2) organohydrogenpolysiloxane that has at least two silicon-bonded hydrogen atoms per molecule
in the presence of
  (a3) a hydrosilylation reaction catalyst.

6. A method of producing the metal particle dispersion structure of claim 5, comprising:
uniformly mixing the (a1) organosilane that has at least two alkenyl groups per molecule and/or organosiloxane that has at least two alkenyl groups per molecule, the (a2) organohydrogenpolysiloxane that has at least two silicon-bonded hydrogen atoms per molecule, the (b2) at least one metal compound having the compositional formula (1), and the (b3) cyclic or chain dimethylpolysiloxane that has a viscosity at 25° C. no greater than 1000 mPa·s and/or at least one organic solvent; and
causing a crosslinking reaction in the presence of the (a3) hydrosilylation reaction catalyst.

7. The metal particle dispersion structure of claim 1, wherein component (b2) is a metal compound and wherein M in the compositional formula (1) is the cation of at least one metal selected from the group consisting of platinum (Pt), gold (Au), silver (Ag), and copper (Cu); L in the compositional formula (1) is a monovalent carboxylate anion represented by $R^1$—COO— ($R^1$ is substituted or unsubstituted $C_{1-20}$ alkyl), an amine represented by $R^2$—$NH_2$ ($R^2$ is substituted or unsubstituted $C_{4-20}$ alkyl), or an alkylenediamine with the formula $H_2N$—$R^3$—$NH_2$ ($R^3$ is substituted or unsubstituted $C_{4-20}$ alkylene); Q in its occurrence as a positively charged counter ion in the compositional formula (1) is a cation selected from the group consisting of the proton ($H^+$), ammonium ion ($NH_4^+$), sodium ion ($Na^+$), and potassium ion ($K^+$); and Q in its occurrence as a negatively charged counter ion in the compositional formula (1) is an anion selected from the group consisting of the nitrate ion ($NO^-$), chloride ion ($Cl^-$), sulfate ion ($SO_4^{2-}$), and perchlorate ion ($ClO_4^-$).

8. The metal particle dispersion structure according to claim 1, that is a film or a thin-film coating layer having a thickness of 0.1 μm to 10,000 μm.

9. The metal particle dispersion structure according to claim 1, that is a particulate metal particle dispersion structure having an average particle size, as yielded by stereoscopic microscopic observation or dynamic light-scattering particle size distribution measurements, in the range of 0.01 to 1000 μm.

10. An article coated with the metal particle dispersion structure according to claim 1.

11. The metal particle dispersion structure according to claim 2, wherein component (A) is organopolysiloxane obtained by crosslinking between (a1) organosilane that has at least two alkenyl groups per molecule and/or organosiloxane that has at least two alkenyl groups per molecule and (a2) organohydrogenpolysiloxane that has at least two silicon-bonded hydrogen atoms per molecule in the presence of (a3) a hydrosilylation reaction catalyst.

12. The metal particle dispersion structure according to claim 5, that is a particulate metal particle dispersion structure having an average particle size, as yielded by stereoscopic microscopic observation or dynamic light-scattering particle size distribution measurements, in the range of 0.01 to 1000 µm.

13. A method of producing the particulate metal particle dispersion structure of claim 12, comprising:

emulsifying the (a1) organosiloxane that has at least two alkenyl groups per molecule, the (a2) organohydrogenpolysiloxane that has at least two silicon-bonded hydrogen atoms per molecule, the (b2) at least one metal compound having the compositional formula (1), the (b3) cyclic or chain dimethylpolysiloxane that has a viscosity at 25° C. no greater than 1000 mPa·s, and the (a3) hydrosilylation reaction catalyst, in water in the presence of (C) an emulsifying agent; and causing a crosslinking reaction in the water.

* * * * *